United States Patent [19]

Bowers

[11] Patent Number: 5,200,929
[45] Date of Patent: Apr. 6, 1993

[54] METHOD FOR ESTIMATING PORE FLUID PRESSURE

[75] Inventor: Glenn L. Bowers, Cypress, Tex.

[73] Assignee: Exxon Production Research Company, Houston, Tex.

[21] Appl. No.: 860,930

[22] Filed: Mar. 31, 1992

[51] Int. Cl.$^5$ .............................................. G01V 1/30
[52] U.S. Cl. ..................................... 367/38; 166/250; 73/152
[58] Field of Search ..................... 367/37, 38; 166/250; 73/152, 151

[56] References Cited

U.S. PATENT DOCUMENTS

| | | | |
|---|---|---|---|
| 3,898,610 | 8/1975 | Pennebaker, Jr. | 340/15.5 CP |
| 4,150,578 | 4/1979 | Swartz | 73/725 |
| 4,524,432 | 6/1985 | Johnson | 367/25 |
| 4,701,891 | 10/1987 | Castagna et al. | 367/31 |
| 4,833,914 | 5/1989 | Ramus | 73/152 |
| 4,981,037 | 1/1991 | Holbrook et al. | 73/152 |
| 5,081,612 | 1/1992 | Scott et al. | 367/38 |

OTHER PUBLICATIONS

Hottman, C. E. and Johnson, R. K.: "Estimation of Formation Pressures from Log-Derived Shale Properties", Jour. Pet. Tech., Jun., 1965.
Pennebaker, E. S.: "An Engineering Interpretation of Seismic Data", SPE 2165.
Foster, J. B. and Whalen, H. E.: "Estimation of Formation Pressures from Electrical Surveys-Offshore Louisiana", Jour. Pet. Tech. (Feb., 1966).
Ham, H. H.: "A Method of Estimating Formation Pressures from Gulf Coast Well Logs", Trans. Gulf Coast Assoc. of Geol. Societies, V. 16, 1966.
Eaton, B. A.: "The Equation of Geopressure Prediction from Well Logs", SPE 5544.
Bellotti, P. and Giacca, D.: "Seismic Data Can Detect Overpressure in Deep Drilling", The Oil and Gas Journal, Aug., 1978.
Weakley, R. R.: "Use of Surface Seismic data to Predict Formation Pore Pressures (Sand Shale Depositional Environments)", SPE 18713.
Weakley, R. R.: "Plotting Sonic Logs to Determine Formation Pore Pressures and Creating Overlays To Do So Worldwide", SPE 19995.
Weakley, R. R.: "Use of Surface Seismic Data to Predict Formation Pore Pressure-Worldwide", SPE 21752.
Holbrook, P. W. and Hauck, M. L.: "A Petrophysical/-Mechanical Mathematical Model for Real-Time Wellsite Pore-Pressure/Fracture Gradient Prediction", SPE 16666.
Alixant, J. L. and Desbrandes, R.: "Explicit Pore-Pressure Evaluation: Concept and Application", SPE Drilling Engineering, Sep., 1991.
Rasmus, J. C. and Gray Stephens, D. M. R.: "Real--Time Pore-Pressure Evaluation from MWD/LWD Measurements and Drilling-Derived Formation Strength", SPE Drilling Engineering, Dec. 1991.
Fillipone, W. R.: "Estimation of Formation Parameters and the Prediction of Overpressure from Seismic Data", Research Symposium on Geopressure Studies, SEG Meeting, Dallas, 1982.

*Primary Examiner*—Ian J. Lobo
*Attorney, Agent, or Firm*—Keith A. Bell

[57] ABSTRACT

A method for estimating pore fluid pressure in a subterranean formation is disclosed for use in drilling wells. A pair of velocity-effective stress relations are used to compute pore fluid pressure from velocity data. One relation applies when the current effective stress is the highest ever experienced by the subterranean formation. The second relation accounts for hysteresis effects when the effective stress has been reduced. Pore fluid pressure is found by subtracting the computed effective stress from an estimate of the overburden stress.

7 Claims, 2 Drawing Sheets

METHOD FOR ESTIMATING PORE FLUID PRESSURE

FIELD OF THE INVENTION

The present invention is a method for estimating pore fluid pressures in a subterranean formation from formation velocity data. The method accounts for hysteresis effects in the relationship between the sonic velocity and the effective stress when overpressure reduces the effective stress in the formation.

BACKGROUND OF THE INVENTION

Typically, while drilling an oil or gas well, the density of the drilling mud must be controlled so that its hydrostatic pressure is not less than the pore fluid pressure in any formation along the uncased borehole (where the borehole is open to the formations). Otherwise, formation fluid may flow into the wellbore, and cause a "kick". Kicks can lead to "blowouts" if the flow is not stopped before the formation fluid reaches the top of the well. And if the fluid contains hydrocarbons, a spark can escalate a blowout into an inferno. Kicks result where the mud weight is too low to balance formation pore fluid pressures. Excessive overbalance, where the hydrostatic pressure of the drilling mud greatly exceeds the pore fluid pressure, is also undesirable. It can induce fractures in the borehole wall that causes lost returns- (i.e., loss of drilling fluid). The drill pipe may also get stuck along contact zones with the borehole wall if the hydrostatic pressure of the mud is too much in excess of the pore fluid pressure. Furthermore, overbalanced mud reduces the penetration rate of the drill bit. This reduced penetration rate increases drilling time which directly increases the associated drilling costs. Therefore, to optimize drilling performance and minimize drilling problems, the mud weight must be adjusted according to the varying pore fluid pressures along the wellbore.

Seismic interval velocities are used to develop pre-drill pore fluid pressure predictions for oil and gas wells. The reliability of these predictions impacts drilling performance, and the risk of kicks, lost returns, and stuck pipe. Pore fluid pressures are also computed from wireline sonic logs as part of the follow-up analysis for a completed well. Post-drill calculations are used to verify the accuracy of the pre-drill forecasts, and to aid in making pore fluid pressure predictions for future wells in the vicinity.

When the pore fluid pressure exceeds the pore fluid's hydrostatic value, the fluid is "overpressured" or "abnormally pressured." It has long been recognized that a formation's sonic velocity is sensitive to the amount of overpressure. However, the prior art has not accounted for varying causes of overpressure and its effects on sonic velocity. Failure to do so can lead to significant errors in the pore fluid pressure predictions.

Under "normal" pressure conditions, a formation is in hydraulic communication with the surface and the pore fluid pressure equals the pore fluid's hydrostatic value. As burial over geologic time increases the overburden stress, the pore fluid is easily expelled out of pore spaces to accommodate sediment compaction. It is only the portion of the overburden stress carried by the sediment grains that causes the grains to compact. This stress, hereafter referred to as the "effective stress," is equal to the difference between the overburden stress and the pore fluid pressure. For normal pressure, the effective stress, density, and sonic velocity all increase with depth.

Overpressure most commonly occurs when low permeability inhibits pore fluid from escaping as rapidly as the pore space would like to compact. Excess pressure develops as the weight of newly deposited sediments squeezes the trapped fluid. Because the fluid has a low compressibility, it supports a majority of the additional overburden load, and retards further compaction. As a result, the effective stress and sonic velocity change more slowly during subsequent burial than they would under normal pressure conditions. On a plot of sonic velocity versus depth along a well, the onset of overpressured formations coincides with the depth at which the velocities start to fall below the trend line followed by normally pressured formations. This overpressuring process is referred to as "undercompaction" or "compaction disequilibrium."

While undercompaction is the most common cause of overpressure, it is not the only cause. Abnormally high pressure can also be generated by thermal expansion of the pore fluid ("aquathermal pressuring"), hydrocarbon maturation, charging from other zones, and expulsion/expansion of intergranular water during clay diagenesis. With these mechanisms, overpressure results from the rock matrix constraining expansion of the pore fluid.

Unlike undercompaction, fluid expansion can cause the pore fluid pressure to increase at a faster rate than the overburden stress. When this occurs, the effective stress decreases as burial continues. The formation is said to be "unloading." Since sonic velocity is a function of the effective stress, the velocity also decreases and a "velocity reversal zone" develops. A velocity reversal zone is an interval on a graph depicting sonic velocity as a function of depth along a well in which the velocities are all less than the value at some shallower depth.

A large portion of the porosity loss that occurs during compaction is permanent; it remains "locked in" even when the effective stress is reduced by fluid expansion. A formation that has experienced a greater effective stress than its current value will be more compacted and have a higher velocity than a formation that has not. Consequently, the relationship between sonic velocity and effective stress is no longer unique when unloading occurs. In other words, for every effective stress, there is no longer one unique sonic velocity. The sonic velocity follows a different, faster velocity-effective stress relationship during unloading than it did when the effective stress was building. This lack of uniqueness is called "hysteresis." Since fluid expansion causes unloading, while undercompaction does not, hysteresis effects make the sonic velocity less responsive to overpressure generated by fluid expansion. As a result, the pore fluid pressure corresponding to a given sonic velocity at a given depth within a velocity reversal zone can be significantly greater if the overpressure was caused by fluid expansion rather than undercompaction. Therefore, the sonic velocity of an overpressured formation is indirectly dependent upon both the magnitude and the cause of overpressure.

While velocity reversal zones are indicative of formations that have undergone unloading, not all velocity reversals are the result of unloading. The velocity will also drop across a transition from a normally pressured sand/shale sequence to a massive, undercompacted shale. The cause of a reversal can be determined by comparing velocity-effective stress data from inside and outside the velocity reversal zone. If the velocity reversal zone data track a separate, faster trend, then the formations within the velocity reversal zone have undergone unloading. If all of the data follow the same trend, then no unloading has occurred.

There are numerous methods for estimating pore fluid pressure from velocity data. The simplest approach utilizes empirical overlays that relate sonic velocity deviations from the "normal trend" (the value expected for hydrostatic pressure) to the pore fluid pressure gradient. One drawback with this method is that it requires a normal trend line for reference. The normal trend is obtained by extrapolating a curve drawn through data assumed to be in hydrostatically pressured zones. However, in some areas, overpressure can start almost from the surface, so there may be little or no data with which to estimate the normal trend.

To work consistently, the overlay approach also requires separate overlays for undercompaction and unloading zones. An overlay constructed from undercompaction data will underestimate the pore fluid pressure in an unloading zone, and vice versa. In some areas this is not a problem, because all of the overpressure is caused by the same type of mechanism. For instance, along the Texas/Louisiana Gulf Coast, the onset of overpressured formations coincides with the start of a velocity reversal zone. However, often there are not enough data to construct local overlays. When overlays from another area with a different source of overpressure are used, significant errors can result.

Other methods for estimating pore fluid pressure make use of the fact that the sonic velocity actually depends upon the effective stress. They equate pore fluid pressure to the difference between the overburden stress and the effective stress. The "equivalent depth" method does this by setting the effective stress in an overpressured zone equal to that computed at another depth where the sonic velocity is the same and the pore fluid pressure is estimated to be hydrostatic. Other techniques use a velocity-effective stress relation constructed from available well data.

All current effective stress approaches fail to recognize that a single velocity-effective stress relation is not always sufficient. Hysteresis effects must be accounted for when overpressure causes unloading. One relationship applies when the current effective stress is the highest ever experienced by the formation. This includes normal pressure and overpressure caused by undercompaction. A second relationship is needed when the effective stress has been reduced, which would be the case when fluid expansion is an important overpressure source. The present invention provides a method for computing pore fluid pressures that accounts for hysteresis effects in the relationship between sonic velocity and effective stress.

SUMMARY OF THE INVENTION

The present invention is a method for estimating the pore fluid pressure at a specified location within a velocity reversal zone. The method may also be used for determining whether the formations within the velocity reversal zone have undergone unloading. The method accounts for hysteresis in the relationship between sonic velocity and effective stress. The hysteresis effects are produced by permanent deformations that remain when a subterranean formation is unloaded from higher stress states.

In general, the present invention utilizes a pair of sonic velocity-effective stress relationships. One velocity-effective stress relationship applies for formations in which the current effective stress is the highest ever experienced. This includes both normally pressured formations and formations overpressured by undercompaction. The second relationship is required where the effective stress has been reduced and hysteresis must be accounted for. This would be the case when fluid expansion is an important overpressure source.

The method comprises estimating the overburden stress at the subterranean location, estimating the approximate sonic velocity at the location, estimating the two approximate relationships between sonic velocity and effective stress, computing the effective stress at the location from the appropriate approximate relationship and approximate sonic velocity, and subtracting the effective stress from the overburden stress to obtain the estimated pore fluid pressure.

To determine the velocity-effective stress relationships, sonic velocity, pore fluid pressure, and overburden stress data are gathered from wells in the vicinity for subterranean formations that have undergone unloading (hereinafter referred to as "unloading data") and those subterranean formations where the effective stress is the maximum ever experienced (hereinafter referred to as "virgin curve data").

The approximate relationship between the sonic velocity and the effective stress for formations whose current effective stress is the highest ever experienced (hereinafter referred to as the "virgin curve relationship") is determined using the virgin curve data. The unloading data are used in combination with the virgin curve relationship to derive the approximate relationship between the sonic velocity and the effective stress for formations that have undergone unloading (hereinafter referred to as the "unloading relationship").

The virgin curve relationship is used to compute the effective stress outside of velocity reversal zones. Within a velocity reversal zone, an effective stress for no unloading is found from the virgin curve relationship, and an effective stress for unloading is calculated from the unloading relationship. A pore fluid pressure is computed for each case, and the results are compared with pore fluid pressure data from velocity reversal zones at vicinity wells. The pore fluid pressure estimate that is most consistent with the vicinity well data is selected as the final answer. In the absence of vicinity well data, the two solutions can be used as lower and upper bounds for the pore fluid pressure.

BRIEF DESCRIPTION OF DRAWINGS

FIGURE 1 is a plot of the magnitude and depth of known pore fluid pressures (expressed as equivalent mudweight) along a well in the vicinity of the specified location at which pore fluid pressure estimates are desired.

FIG. 2 illustrates sonic velocities derived from sonic or seismic data for the well.

FIG. 3 illustrates the relationship between overburden stress (dashed line), effective stress ($\sigma$) and pore fluid pressure (P) for the well.

FIG. 4 depicts sonic velocity-effective stress data gathered from the well, and illustrates the difference between virgin curve data (from outside the velocity reversal zone) and unloading data (from within the velocity reversal zone).

FIG. 5 illustrates the physical significance of the parameters used to normalize the unloading data.

FIG. 6 shows the unloading data from FIG. 4 after they have been normalized.

In FIGS. 1, 3, and 4, the open circles represent data from within a velocity reversal zone and the solid circles indicate data from outside a velocity reversal zone for a well in the vicinity of the specified location. The location of the velocity reversal zone is shown in FIG. 2 at 10. FIGS. 1-4 and 6 are representative of the data for one well in the vicinity of the specified location. The data in FIGS. 1-3 are gathered from other wells in the vicinity of the specified location and are plotted together on graphs similar to FIGS. 4 and 6.

DETAILED DESCRIPTION OF PREFERRED EMBODIMENTS

Figure 4:
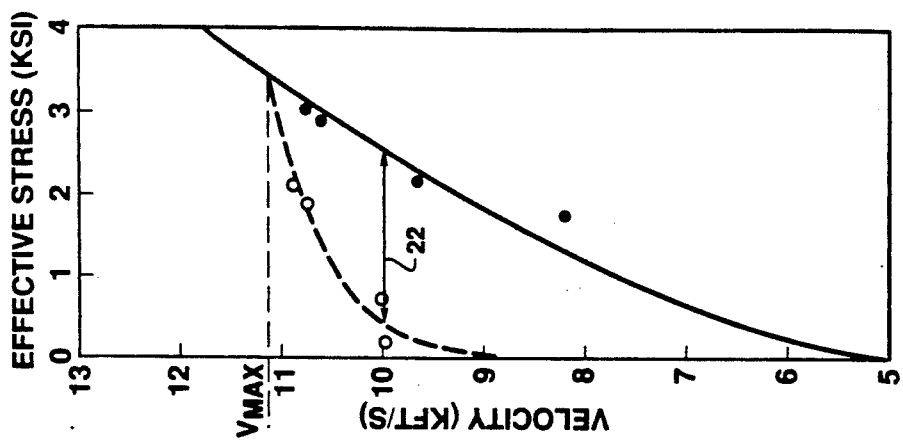
FIGURES 1-6 present the data plotted when performing the method of the present invention.

The present invention is a method for utilizing seismic or sonic log data to estimate the pore fluid pressure at a specified location in a formation that accounts for hysteresis in the relationship between sonic velocity and effective stress resulting from unloading. The method may also be used for determining whether the subterranean formation within a velocity reversal zone has undergone unloading. Hereinafter, seismic or sonic log data will be referred to as "sonic velocity data". To the extent that the following detailed description is specific to a particular embodiment or a particular use of the invention, it is intended only as illustrative and is not to be construed as limiting.

The present invention equates the pore fluid pressure at a specified location within a subterranean formation to the difference between the overburden stress and the effective stress at that point.

$$P = S - \sigma \quad (1)$$

where:
P is the pore fluid pressure,
S is the overburden stress, and
$\sigma$ is the effective stress.

The overburden stress is found by integrating density data from vicinity wells (pre-drill) or the current well (post-drill). If there are no vicinity wells, then the overburden stress distribution from a geologically similar area is used. The effective stress is computed from the velocity data. Once the pore fluid pressure is calculated, the drilling fluid density required to drill the well at that depth can then be determined.

The present invention is a method to accurately compute the fluid pressure from the velocity data when overpressure is caused by mechanisms other than undercompaction. The present pore fluid pressure prediction method recognizes that overpressure caused by fluid expansion can decrease the effective stress in a formation, and that during unloading, hysteresis occurs in the relationship between sonic velocity and effective stress. These hysteresis effects are produced by permanent deformations that remain in a formation during unloading from higher stress states. The residual deformations inhibit decompaction, and cause the sonic velocity of a formation to track a different, faster velocity-effective stress relation during unloading than was followed when the effective stress was increasing in the formation.

To account for hysteresis effects during unloading, the present invention utilizes two relationships between sonic velocity and effective stress. The virgin curve relationship represents the approximate velocity-effective stress relationship for formations in which the current effective stress is the highest ever experienced. This includes both normally pressured formations and formations overpressured by undercompaction. The unloading relationship defines the approximate velocity-effective stress relationship for formations in which the effective stress has been reduced. This would be the case when fluid expansion is an important overpressure source. As discussed in detail below, both relationships are determined from data gathered from wells in the vicinity of the specified location.

Figure 2:
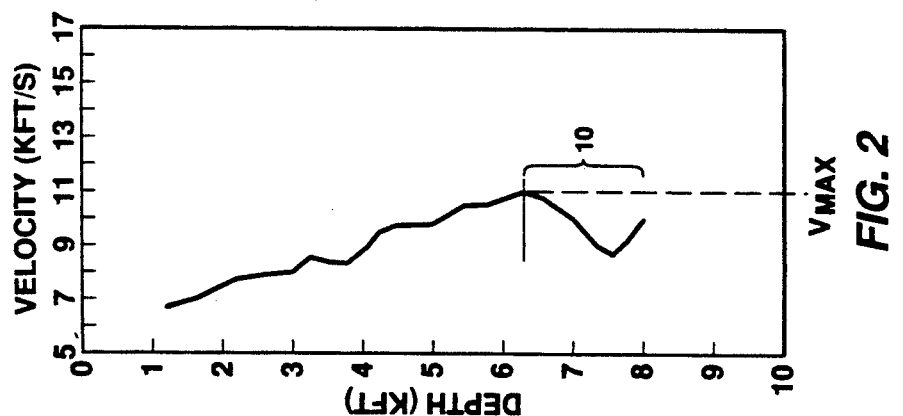
Figure 1:
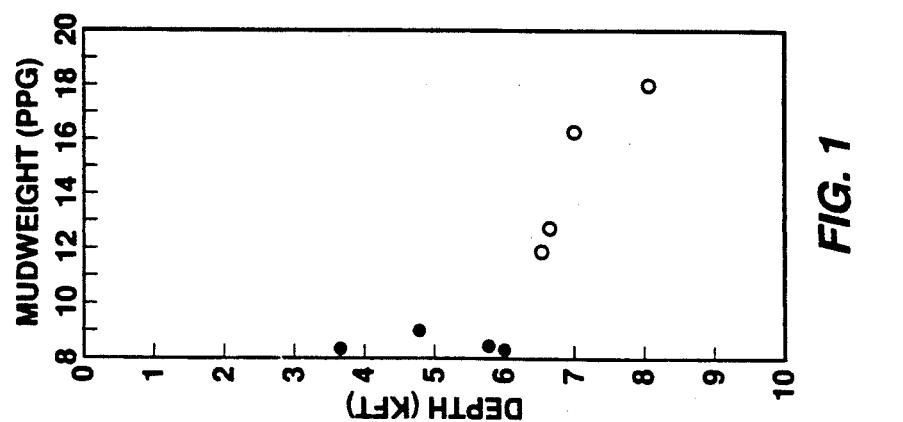

Hysteresis effects must be considered when calculating the pore fluid pressure within a velocity reversal zone. FIGS. 1-4 illustrate the importance of hysteresis effects. FIG. 2 shows velocity-depth data from a well with a velocity reversal zone 10, while FIG. 1 is a plot of measured pore fluid pressure versus depth along the well. The pore fluid pressure data are expressed as their equivalent mudweights, which is the density of a column of drilling fluid must have to balance the pore fluid pressure at that depth. Data plotted with solid circles are from outside the velocity reversal zone, while open circles denote pressure measurements from within the reversal zone. For this well, the onset of abnormally high pore fluid pressure begins at approximately the same depth as the start of the velocity reversal zone 10.

Figure 3:
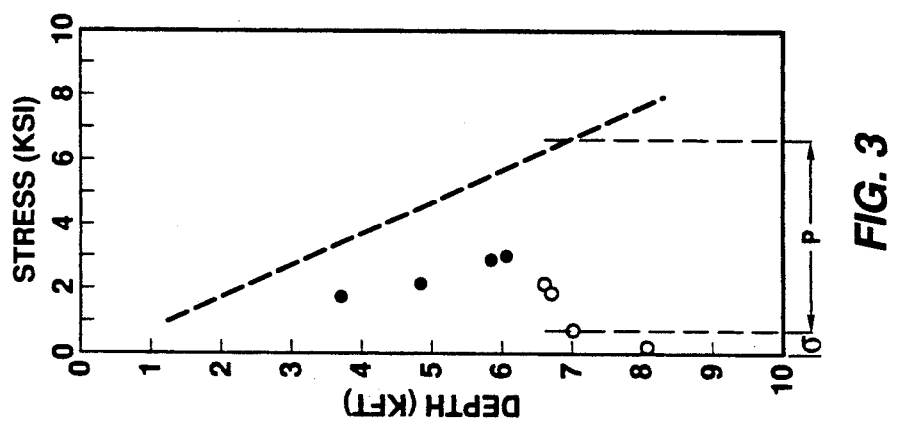

FIG. 3 shows the overburden stress distribution for this well (dashed line), and the effective stresses that were computed from each measured pore fluid pressure by rearranging Equation 1 into the form:

$$\sigma = S - P \quad (2)$$

As with the pore fluid pressure data, solid circles indicate data from outside the velocity reversal zone 10, while open circles denote data from within the velocity reversal zone 10. It can be seen from FIGS. 2 and 3 that as the velocity drops, so does the effective stress.

The effect of hysteresis is shown in FIG. 4, which plots the effective stress data from FIG. 3 versus their corresponding sonic velocities from FIG. 2. FIG. 3 illustrates that the data from inside the velocity reversal zone 10 (open circles) track a much faster trend than the data from outside the velocity reversal zone 10 (solid circles). This indicates that the formations from within the velocity reversal zone have undergone unloading. The trend followed by the formations from outside the velocity reversal zone 10 is the virgin curve (solid line), while the velocity reversal zone data are tracking an unloading curve, shown by the dashed line.

If the virgin curve relationship were used to estimate the effective stresses within the velocity reversal zone 10, it can be seen from FIG. 4 that the effective stresses would be overestimated by as much as 2100 psi as shown at 22. From Equation 1, this means the pore fluid pressures within the velocity reversal zone 10 would be underestimated by up to 2100 psi. Using these pore fluid pressure estimates to determine mud weight requirements within the velocity reversal zone could lead to a kick.

On the other hand, not every velocity reversal zone is caused by unloading. The velocity will also drop across a transition from a normally pressured sand/shale sequence to a massive undercompacted shale. If the velocity reversal zone was not caused by unloading, and the effective stresses were incorrectly computed from the unloading curve in FIG. 4, the pore fluid pressure would by overestimated by as much as 2100 psi. This could lead to a heavily overbalanced drilling fluid density, which would reduce the penetration rate of the drill bit, and could cause problems with lost returns or stuck drill pipe.

Therefore, the present invention has two key aspects: 1) it utilizes a pair of velocity-effective stress relationships to account for hysteresis during unloading, and 2) it defines a systematic procedure for determining when each relationship should be used. In the discussion that follows, first the process for determining the virgin curve relationship and unloading relationship is described, and then the procedure for choosing the appropriate relationship is explained.

The first step in the process for determining the virgin curve and unloading relationships is to identify wells in the vicinity of the location in question (hereafter referred to as "vicinity wells") that have the following data: 1) estimated or measured pore fluid pressures at one or more depths along the well, 2) sonic velocity data, and 3) known or estimated overburden stress distributions. The overburden stress is obtained by integrating density data from soil borings and wireline logs either at the wellsite or at a geologically similar well. FIG. 1 illustrates the pore fluid pressure data that may be available from a vicinity well, FIG. 2 shows the velocity for the well, while the dashed line FIG. 3 represents the overburden stress distribution.

The next step is to use Equation 2 to calculate the effective stress at the depth of each known pore fluid pressure for each vicinity well. The circles in FIG. 3 represent the corresponding effective stress calculated from Equation 2 using the pore fluid pressure data from FIG. 1 and the estimated overburden stress.

The effective stress data in FIG. 3 (effective stress v. depth) are combined with the velocity data in FIG. 2 (velocity vs. depth) to obtain velocity-effective stress data from a vicinity well. Specifically, the precise depth is determined for each data point in FIG. 3 at which an effective stress has been computed from a known pore fluid pressure, and the corresponding velocity at that depth is determined from FIG. 2. The velocity-effective stress data are then plotted as illustrated in FIG. 4. The preceding process is repeated for each vicinity well and the resulting data are plotted together on a graph similar to FIG. 4.

The next step of the method is to characterize and divide the data into virgin curve data and unloading data. The unloading data are characterized by a faster velocity trend than velocity data from formations that have not undergone unloading, as shown by the dashed line in FIG. 4. The virgin curve data are from formations that are not undergoing unloading. Whereas, the unloading data are from velocity reversal zones in which the formations have undergone effective stress reductions.

To determine the approximate unloading relationship (which accounts for hysteresis effects) between effective stress and sonic velocity in an unloading zone, the approximate virgin curve relationship must be determined first. Thereafter, the unloading data are used in conjunction with the virgin curve relationship to determine the approximate unloading relationship.

The virgin curve relationship is determined by curve fitting the virgin curve data. To curve fit the virgin curve data, use an empirical relationship such as the following relationship, which represents the relationship between effective stress and sonic velocity in the absence of unloading, and solve for constants A and B:

$$V = C + A\sigma^B \tag{3}$$

where:
- $\sigma$ is the effective stress in the absence of unloading,
- V is the approximate sonic velocity,
- A, B are the constants derived from curve fitting the virgin curve data, and
- C represents the speed of sound of freshly deposited sediments at the ground surface. Typically C is equal to approximately 5,000 feet per second.

The solid line in FIG. 4 illustrates the results of curve fitting the vicinity well virgin curve data using Equation 3.

The approximate unloading curve relationship, which represents the relationship between sonic velocity and effective stress during unloading, can be represented by the following empirical relationship:

$$V = C + A\,[\sigma_{max}(\sigma/\sigma_{max})^{(1/U)}]^B \tag{4}$$

where:
- V is the approximate sonic velocity,
- $\sigma$ is the effective stress during unloading, $$\sigma_{max} = \left(\frac{V_{max} - C}{A}\right)^{(1/B)},$$

is the estimated effective stress just before unloading, where $\sigma_{max}$ is equal to $\sigma$ and V is equal to $V_{max}$ in Equation 3,

- $V_{max}$ is the estimated sonic velocity just before unloading,
- U is a constant derived by curve fitting the unloading curve data, and
- A,B,C are constants in the virgin curve relationship (Equation 3).

Figure 5:
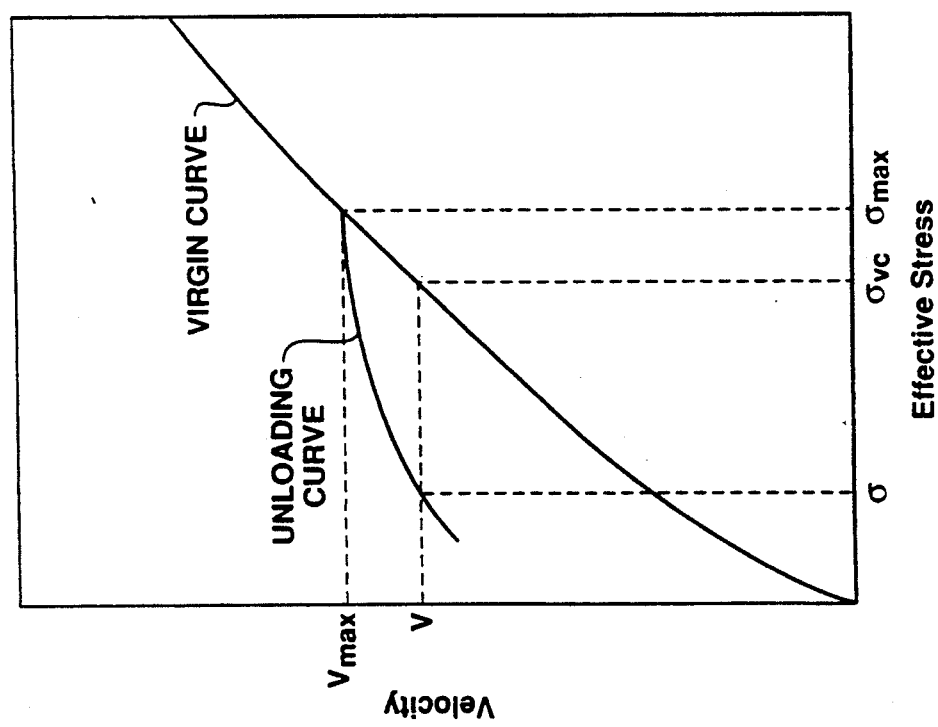

Equation 4 accounts for hysteresis during unloading, with $V_{max}$ and $\sigma_{max}$ representing estimates of the formation's sonic velocity and effective stress just before unloading began. As illustrated in FIG. 2, $V_{max}$ for all formations within a velocity reversal zone is typically taken as the sonic velocity at the start of the velocity reversal zone, provided no significant geologic changes occur across the velocity reversal zone. $V_{max}$ is an estimate of the maximum sonic velocity a formation had before its effective stress was reduced. A maximum sonic velocity ($V_{max}$) is estimated for each velocity reversal zone at each vicinity well from which there are unloading data. The effective stress $\sigma_{max}$ is the effective stress at which the "maximum velocity" ($V_{max}$) intersects the virgin curve, as illustrated in FIG. 5.

The unloading curve parameter U is a measure of how plastic the sediment is, with U=1 and U=∞ defining the two limiting cases. For U=1, the unloading curve is equivalent to the virgin curve, which means the sediment is perfectly elastic, and no hysteresis effects are present. For U=∞, the velocity remains fixed at $V_{max}$ for all values of effective stress less than $\sigma_{max}$. This corresponds to a perfectly plastic sediment that cannot undergo any decompaction during unloading. In practice, U typically ranges between 2 and 10.

Unloading data from more than one vicinity well will generally follow multiple unloading curves because $V_{max}$ may vary from well to well. To determine the unloading parameter U, the unloading data for each velocity reversal zone are rescaled so that all of the vicinity well data lie along a single curve. The resulting process is termed "normalizing". The following relationship, which is equivalent to Equation 4, is used to normalize the data for each vicinity well:

$$(\sigma/\sigma_{max}) = (\sigma_{vc}/\sigma_{max})^U \quad (5)$$

where:
- $\sigma_{max}$ is calculated from the virgin curve relationship (Equation 3) using the maximum sonic velocity $V_{max}$, and is an estimate of the maximum value of the effective stress before it was reduced.
- $\sigma_{vc}$ is the equivalent virgin curve effective stress calculated from the virgin curve relationship using the approximate velocity in the velocity reversal zone.
- U is the unloading parameter.

$\sigma_{vc}$ and $\sigma_{max}$ are found using the virgin curve relationship (Equation 3). As solved for effective stress, the velocities in the velocity reversal zones are converted to equivalent virgin curve effective stresses $\sigma_{vc}$ as follows:

$$\sigma_{vc} = \left(\frac{V - C}{A}\right)^{(1/B)} \quad (6)$$

$V_{max}$ is used to find $\sigma_{max}$ for each velocity reversal zone of the vicinity wells using Equation 6 where $V = V_{max}$ and $\sigma_{vc} = \sigma_{max}$.

To normalize the unloading data, the effective stresses $\sigma$ (found using Equation 2 and the measured pore fluid pressures) and the associated equivalent virgin curve effective stresses $\sigma_{vc}$ are divided by the maximum effective stress $\sigma_{max}$ for the velocity reversal zone the data are from.

Figure 6:
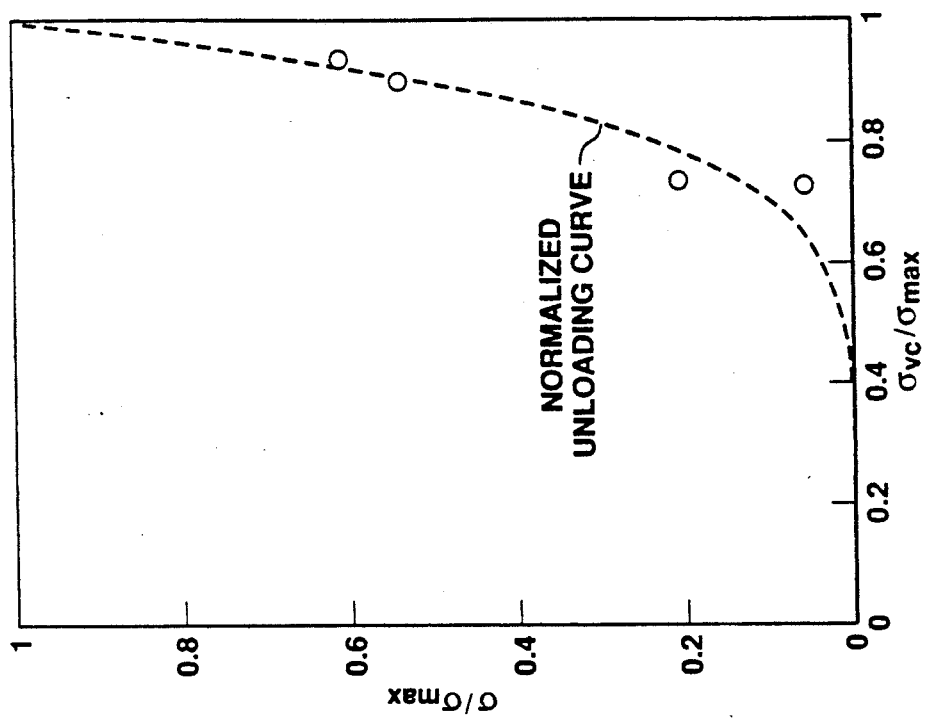

FIG. 5 illustrates the physical meaning of $\sigma_{vc}$ and $\sigma_{max}$, and shows how they relate to $\sigma$, V and $V_{max}$. This normalizing procedure condenses unloading data from multiple velocity reversal zones onto a single curve as illustrated by the upper curve in FIG. 5. FIG. 6 shows the unloading data in FIG. 4 replotted as $(\sigma/\sigma_{max})$. The next step is to curve fit the normalized data using Equation 5 to obtain the constant "U".

The dotted line in FIG. 6 represents the approximate unloading relationship derived from the normalized unloading data and Equation 5. The unloading relationship (Equation 4) in its dimensional form is shown by the dotted line in FIG. 4.

Once U is derived from the unloading relationship (Equation 5), Equation 4 is solved for the effective stress as a function of sonic velocity in an unloading zone by replacing $\sigma_{max}$ with Equation 6. The following unloading relationship results:

$$\sigma_u = \left(\frac{V_{max} - C}{A}\right)^{(1/B)} * \left(\frac{V - C}{V_{max} - C}\right)^{(U/B)} \quad (7)$$

where:
- $\sigma_u$ is equal to $\sigma$ in Equation 4 and represents the effective stress computed from the unloading relationship at the specified location,
- $V_{max}$ is an estimate of the value of the velocity before the effective stress was reduced, typically taken as the velocity at the start of the velocity reversal zone, and
- V is the approximate velocity in the velocity reversal zone at the specified location.

For a specified location in a subterranean formation outside of a velocity reversal zone, solve for the effective stress by inverting the approximate virgin curve relationship (Equation 3) into a form similar to Equation 6, with $\sigma_{vc}$ replaced by $\sigma$. Substitute this result into Equation 1 to compute the pore fluid pressure and the required drilling fluid density.

For a specified location within a velocity reversal zone, solve Equation 7 for the unloading effective stress $\sigma_u$, and substitute the result into Equation 1 to obtain the unloading pore fluid pressure $P_u$. To verify whether the velocity reversal zone was caused by unloading, calculate the effective stress ($\sigma_{uvc}$) with the approximate virgin curve relationship (Equation 6) using the approximate velocity in the velocity reversal zone for the specified location. Calculate the pore fluid pressure ($P_{uvc}$) by solving Equation 1 for $P_{uvc}$ where $\sigma$ is equal to $\sigma_{uvc}$.

If the $P_u$ data across the velocity reversal zone are substantially consistent with measured or estimated pore fluid pressure (P data) within velocity reversal zones from vicinity wells, then the velocity reversal zone is the result of unloading. In this case, calculate the drilling fluid density for the velocity reversal zone using $P_u$ for the specified location in the subterranean location.

If the $P_{uvc}$ data are substantially consistent with P data within velocity velocity reversal zones of vicinity wells, then the velocity reversal zone is not a result of unloading and undercompaction was the primary cause of overpressure. In this case the drilling fluid density for the velocity reversal zone should be calculated using $P_{uvc}$ for the specified location.

The present method may also be used to estimate pore fluid pressure for wildcat wells (i.e., for areas with no vicinity wells). In this case, U must be estimated from values for other geologically similar areas. The same is true for A and B when a normal trend cannot be established on the velocity-depth graph. However, when a normal trend is evident, A and B can be approximated from the velocities at the interpretation site. An estimate is made of the normal pore fluid pressure distribution. For instance, in FIG. 1, normal pressure can be approximated by constant equivalent mudweight of 8.7 ppg. Velocities are then picked at several points along the normal trend, and the associated effective stresses are estimated using the normal pore fluid pressure profile and an overburden stress distribution from a geologically similar area. The resulting velocity-effective stress data are fit with the virgin curve relationship to obtain A and B. In the absence of vicinity well pore fluid pressure data, the $P_{uvc}$ data and $P_u$ data can be used as the lower and upper bounds, respectively, for potential pore fluid pressures that may be encountered within the subterranean formation at the specified location.

As described above, the present invention satisfies the need of determining pore fluid pressure where overpressure is caused from unloading of the subterranean formation and hysteresis effects must be accounted for. However, this invention should not be unduly limited to the foregoing which has been set forth solely for illustrative purposes. Various modifications and alterations of the invention will be apparent to those skilled in the art without departing from the true scope of the invention as defined in the following claims.

I claim:

1. A method for estimating the pore fluid pressure at a specified location in a subterranean formation, said location being in a velocity reversal zone resulting from unloading, said method comprising the steps of:
- (a) estimating the approximate sonic velocity at said location in said subterranean formation;
- (b) estimating the overburden stress at said location in said subterranean formation;
- (c) estimating the approximate relationship between effective stress and sonic velocity within said velocity reversal zone taking into account any hysteresis effects resulting from said unloading of said subterranean formation;
- (d) computing the effective stress at said location in said subterranean formation from said approximate sonic velocity and said approximate relationship between effective stress and sonic velocity; and
- (e) subtracting said effective stress from said overburden stress to obtain said pore fluid pressure.

2. The method of claim 1, wherein said overburden stress is estimated by integrating density data obtained from geologically similar wells.

3. The method of claim 1, wherein the step of estimating said approximate relationship between effective stress and sonic velocity within said velocity reversal zone further comprises the steps of:
- (a) gathering virgin curve data for wells in the vicinity of said specified location;
- (b) determining the approximate virgin curve relationship from said virgin curve data;
- (c) gathering unloading data from said wells in the vicinity of said specified location;
- (d) estimating the maximum velocities for said unloading data;
- (e) determining maximum effective stresses for said other wells in the vicinity using said approximate virgin curve relationship and said maximum velocities;
- (f) determining equivalent virgin effective stress by solving said approximate virgin curve relationship for said unloading data; and
- (g) determining said approximate relationship between effective stress and sonic velocity using said unloading data, said equivalent virgin effective stress data, and said maximum effective stress data.

4. A method for estimating the pore fluid pressure at a specified location in a subterranean formation, said location being in a velocity reversal zone resulting from unloading, said method comprises the steps of:
- (a) estimating effective stresses for wells in the vicinity of said specified location;
- (b) estimating the approximate velocities for wells in the vicinity of said location;
- (c) determining the approximate virgin curve relationship between effective stress and sonic velocity for said wells in the vicinity of said formation, where said virgin curve relationship does not account for said unloading;
- (d) determining the approximate unloading relationship between effective stress and sonic velocity within said velocity reversal zone taking into account any hysteresis effects resulting from said unloading;
- (e) estimating the approximate sonic velocity at said location in said subterranean formation;
- (f) computing effective stress for said approximate sonic velocity at said location in said velocity reversal zone of said formation using said unloading relationship;
- (g) estimating the overburden stress at said location in said subterranean formation; and
- (h) subtracting said effective stress from said overburden stress to obtain said pore fluid pressure.

5. The method of claim 4, wherein said overburden stress is estimated by integrating density data from geologically similar wells.

6. The method of claim 4, wherein said approximate unloading relationship is determined by:
- (a) estimating the approximate effective stress corresponding to said approximate sonic velocities for said wells in the vicinity of said formation;
- (b) computing the equivalent virgin effective stress data for wells in the vicinity of said location using said approximate virgin curve relationship for said unloading data;
- (c) estimating the maximum sonic velocities for said unloading data;
- (d) determining maximum effective stress data using said approximate virgin curve relationship and said maximum sonic velocities;
- (e) normalizing said unloading data using said approximate effective stress data, said equivalent virgin effective stress data, and said maximum effective stress data; and
- (f) curve fitting said normalized data with a single curve.

7. The method of claim 4, wherein the step of estimating effective stresses for wells in the vicinity of said specified location further comprises:
- (a) estimating pore fluid pressures at said wells in the vicinity of said specified location;
- (b) estimating the overburden stress as a function of depth for said wells in the vicinity of said specified location; and
- (c) estimating actual effective stresses by subtracting said pore fluid pressures from said overburden stresses.

* * * * *